United States Patent
Kjær et al.

(10) Patent No.: US 9,709,034 B2
(45) Date of Patent: Jul. 18, 2017

(54) PARTIAL-LOAD DE-RATING FOR WIND TURBINE CONTROL

(75) Inventors: Martin Ansbjerg Kjær, Harlev J (DK); Eik Herbsleb, Odder (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 158 days.

(21) Appl. No.: 14/421,312

(22) PCT Filed: Aug. 14, 2012

(86) PCT No.: PCT/DK2012/050294
§ 371 (c)(1),
(2), (4) Date: May 7, 2015

(87) PCT Pub. No.: WO2014/026688
PCT Pub. Date: Feb. 20, 2014

(65) Prior Publication Data
US 2015/0267686 A1    Sep. 24, 2015

(51) Int. Cl.
*F03D 7/02* (2006.01)
*F03D 9/00* (2016.01)
*F03D 9/25* (2016.01)

(52) U.S. Cl.
CPC .......... *F03D 7/0284* (2013.01); *F03D 7/028* (2013.01); *F03D 7/0224* (2013.01); *F03D 7/0272* (2013.01); *F03D 9/255* (2017.02); *F05B 2270/1033* (2013.01); *F05B 2270/337* (2013.01); *Y02E 10/723* (2013.01); *Y02E 10/725* (2013.01)

(58) Field of Classification Search
CPC ...... F03D 7/0284; F03D 7/028; F03D 7/0224; F03D 9/003; F03D 7/0272; F03D 9/255
USPC .................................................... 290/44, 55
See application file for complete search history.

(56) References Cited

U.S. PATENT DOCUMENTS

| | | | |
|---|---|---|---|
| 2006/0132993 A1* | 6/2006 | Delmerico | F03D 7/0284 361/20 |
| 2007/0205602 A1* | 9/2007 | Willey | F03D 7/0224 290/44 |
| 2008/0136188 A1 | 6/2008 | Krueger | |

(Continued)

OTHER PUBLICATIONS

International Search Report for PCT/DK2012/050294, Apr. 26, 2013.

*Primary Examiner* — Viet Nguyen
(74) *Attorney, Agent, or Firm* — Patterson+Sheridan, LLP

(57) ABSTRACT

Methods, controllers and computer program products for controlling a wind turbine. Under de-rated operating conditions in which the power requested from a wind turbine is less than the available power, a controller adjusts blade pitch of the wind turbine to reduce the rotor power coefficient. The captured wind power is thereby reduced to be approximately equal to the requested electrical power, which is less than either the available power or the rated power of the wind turbine generator. This reduction in captured power provides the controller with an additional degree of freedom that allows the controller to increase the electrical power output of the wind turbine in response to wind fluctuations without damaging the wind turbine. By allowing increases in power under de-rated conditions, the controller may reduce the amount of pitching necessary to prevent the turbine from exceeding its rated power output level.

11 Claims, 5 Drawing Sheets

(56) References Cited

U.S. PATENT DOCUMENTS

| | | | |
|---|---|---|---|
| 2009/0212563 A1* | 8/2009 | Morjaria | F03D 7/0284 290/44 |
| 2009/0218819 A1* | 9/2009 | Miller | F03D 9/003 290/44 |
| 2010/0283245 A1* | 11/2010 | Gjerlov | F03D 7/0224 290/44 |
| 2010/0283246 A1* | 11/2010 | Christensen | F03D 7/0292 290/44 |
| 2010/0286835 A1* | 11/2010 | Nyborg | F03D 7/0224 700/287 |
| 2011/0049885 A1 | 3/2011 | Hernandez et al. | |
| 2011/0089693 A1* | 4/2011 | Nasiri | F03D 7/0272 290/44 |
| 2011/0301769 A1* | 12/2011 | Lovmand | F03D 7/028 700/287 |

* cited by examiner

PARTIAL-LOAD DE-RATING FOR WIND TURBINE CONTROL

TECHNICAL FIELD

This application relates generally to methods and systems for controlling wind turbines and, more specifically, to methods and systems for controlling the power output of wind turbine generators under de-rated operating conditions.

BACKGROUND

Generally, a wind turbine is a rotating machine that converts the kinetic energy of wind into mechanical energy and, when used for power generation, converts this mechanical energy into electrical energy. Due to their ability to generate electrical power without consuming fossil fuels, wind turbines are increasingly being used as an alternative energy source for providing power to the electrical grid. A wind turbine used for electrical power generation typically includes a rotor having a plurality of blades configured to capture wind power. The rotor is coupled to a generator that converts the rotational energy of the rotor into electrical energy. As the wind speed increases above the minimum or "cut-in" speed ($W_{MIN}$) for the turbine, the rotor begins to rotate so that the wind turbine can begin producing electrical power. The power output of the wind turbine generally increases with wind speed until the wind speed reaches a nominal or rated wind speed ($W_R$) for the wind turbine. Above the rated wind speed $W_R$, the power output of the wind turbine is limited by the rated power output ($P_R$) of the generator. As the wind speed increases further, the wind speed may reach a cut-out or furling speed ($W_C$), at which point the wind turbine may be shut down to prevent damage to the rotor and/or generator.

Because the output of the generator varies with wind conditions, the generator is normally coupled to the grid by a power converter that conditions the power output of the generator to meet grid voltage, current, phase, and frequency demands. To provide utility scale power to the electrical grid, a wind power system may include one or more wind turbines, with a typical wind power system comprising a wind farm having multiple wind turbines ganged together to provide power to the grid at a common connection point. The collective output of the wind farm at the common connection point may be controlled by a centralized power plant controller (which may be part of a Supervisory Control and Data Acquisition (SCADA) system) that interacts with individual wind turbine controllers to meet electrical grid demands.

Each wind turbine may be controlled—either remotely or locally—by a controller that controls the rotor speed and power output of the wind turbine. The turbine controller thereby keeps the wind turbine operating within its design parameters as well as according to grid power demands. To this end, the turbine controller may include a pitch controller that adjusts the amount of wind power captured by the rotor by adjusting the pitch of the rotor blades. The turbine controller may also include a power converter controller that adjusts the electrical power provided to the grid by the power converter. The amount of wind power captured by the rotor and the amount of electrical power provided to the grid may thereby be selectively adjusted by the turbine controller to control both the speed of the rotor and the electrical power output of the generator.

The amount of power associated with wind is proportional to the cube of the wind's velocity. Thus, a rotor can produce more mechanical power from wind having a relatively high velocity than from wind having relatively low velocity. The efficiency with which the rotor converts the energy contained in the wind into mechanical energy is known as the power coefficient ($C_P$) of the rotor, and is theoretically limited to a maximum of 59% by Betz' Law. The actual power coefficient for a rotor will typically be less than the Betz limit, and depends on the design and operating parameters of the rotor. The amount of wind power that is captured and converted into mechanical power by the rotor, or the "aerodynamic power" is thus a product of the power coefficient of the rotor and the power available from the wind. For a given wind speed, the rotor will have a maximum, or optimal power coefficient $C_P$ that is achieved at a particular blade pitch setting and rotational speed. This optimal power coefficient thus sets an upper limit on how much power the turbine can generate at that wind speed. At wind speeds below $W_R$, conventional wind turbines are thus operated with blade pitch and rotational speed settings that optimize $C_P$ to maximize power capture. However, as the wind speed increases above $W_R$, aerodynamic power is limited by adjusting the blade pitch to reduce $C_P$. In conventional wind power systems at wind speeds above $W_R$, the rotor is controlled by adjusting the blade pitch in response to changes in wind speed so that captured aerodynamic power does not exceed the rated power of the generator. That is, when the available aerodynamic power is greater than or equal to the rated output of the wind turbine, blade pitch becomes the primary control means used to maintain turbine output at a constant level.

Wind turbines are normally operated to produce the maximum amount of electrical power possible under existing wind conditions so that other sources of electrical power on the grid may be throttled back to conserve non-renewable energy sources. Referring now to FIG. 1, a graphical diagram 10 illustrates an exemplary power curve 12 showing this maximum or "available power" as a function of wind speed. In a low-wind region 14 of the available power output curve 12 between the cut-in wind speed $W_{MIN}$ and the rated wind speed $W_R$, the available aerodynamic power is less than the rated power output $P_R$ of the wind turbine generator. Thus, the available power 12 in the low wind region 14 is limited by the wind power that the rotor can capture while operating at optimal blade pitch and rotational speed. In a high-wind region 16 between the rated wind speed $W_R$ and the cut-out wind speed $W_C$, the available aerodynamic power is greater than the rated output power $P_R$ of the wind turbine generator. The available power 12 in the high-wind region 16 is thus limited to $P_R$.

To maximize wind turbine power output, conventional turbine controllers are configured to output the available power 12 by operating in one of two control modes depending on wind speed: (1) a partial-load control mode that operates in the low-wind speed region 14, or (2) a full-load control mode that operates in the high-wind speed region 16. The turbine controller thus switches from partial-load to full-load control mode in a transition region 17 of the available power curve 12. The turbine controller thereby controls the power output of the wind turbine so that the turbine is producing power at the available output power level 12 for the current wind speed. When operating in the partial-load region, the controller adjusts the pitch and speed of the rotor to optimize $C_P$ so that the wind turbine captures as much wind energy as possible. That is, the blade pitch and rotor speed are adjusted to optimize $C_P$ for the current wind speed. In the partial-load region, the blade pitch is maintained at an optimum wind capture angle that does not typically change rapidly or frequently with wind speed. The rotor speed may then be set to optimize wind energy capture for the current wind speed by adjusting the amount of power being provided to the grid by the power converter until an optimal tip speed ratio is achieved. In contrast, when operating in the full-load region, the turbine controller adjusts the pitch of the rotor blades so that the rotor only captures enough of the available wind energy to operate the generator at its rated output. Thus, in the full-load region, the electrical power output is maintained at a relatively constant value by the power converter controller, and the blade pitch is adjusted by the wind turbine controller in response to changes in wind speed to maintain the rotor at a generally constant speed and power output level.

A conventional wind turbine controller operating in a power-optimal control mode typically operates as a full-load controller when the wind speed exceeds $W_R$, and as a partial-load controller when the wind speed is below $W_R$. In the full-load control mode of operation, the power converter control system is provided with a fixed power reference signal by the power plant controller, and the rotor speed is controlled by the pitch controller to maintain constant power output. To this end, the pitch controller pitches the blades out of the wind to reduce the power coefficient of the rotor in response to increases in wind speed, and pitches the blades into the wind to increase the power coefficient in response to reduced wind speed. In the partial-load control region that operates at wind speeds below $W_R$, the pitch controller adjusts the blade pitch position to one or more pre-defined optimal positions (e.g., 0°) that provide optimal wind energy capture for the current wind speed. The power converter controller is then provided with a power set-point that couples sufficient electrical power to the grid to maintain the rotational speed of the rotor at an optimal level for the capturing wind energy at the current wind speed. Pitch control thus provides the primary means of controlling output power when the controller is operating in the full-load region of the power output curve 12, and the power converter provides the primary means of controlling output power when the wind turbine controller is operating in the partial-load region of the power output curve 12. Because the pitch control system—rather than the power converter control system—is primarily responsible for compensating for the stochastic behavior of the wind when the controller is operating in the full-load control region, pitching activity is typically significantly higher when the controller is operating in full-load control mode than in partial-load control mode.

At times, the plant controller may request a specific power production level from the turbine which is lower than the available power level. This is commonly referred to as de-rating, and may be used during times of reduced grid demand or to provide an operating reserve to improve grid stability. De-rating is accomplished in conventional systems by providing a power control signal to the turbine controller that causes the controller to reduce maximum turbine output power below the rated output power $P_R$. The maximum power output of the turbine is thereby limited to the de-rated power $P_D$. An exemplary de-rated power output curve 18 thus limits power to $P_D$ at wind speeds above $W_D$, which is the wind speed at which the rotor can produce aerodynamic power equal to the de-rated power level. As a result of this lower power demand, the transition region 17 shifts as indicated by arrow 19 so that the turbine controller switches between partial-load and full-load operation at $W_D$ rather than $W_R$. Thus, if the turbine is operating at a wind speed between $W_D$ and $W_R$ under de-rated operating conditions, the wind turbine controller will operate in the full-load control region. This is in contrast to turbine controller operation when the power plant controller is implementing a power-optimal solution, which would implement partial-load turbine control at wind speeds between $W_D$ and $W_R$. Therefore, as a consequence of de-rating, the range of full-load operation is extended to wind speeds between $W_D$ and $W_R$. Blade pitching activity may thereby be increased over a greater operating range of wind speeds in de-rated wind turbines as compared wind turbines being operated at full capacity. The higher the de-rating (i.e., the lower the power reference signal provided to the wind turbine controller), the further full-load operation is extended below the rated wind speed $W_R$, and the more blade pitching activity is increased. Conventionally controlled wind turbine systems may therefore experience greater pitch system wear under de-rated operation than during full power operation.

Thus, there is a need for improved systems, methods, and computer program products for controlling wind power systems under de-rated conditions that reduces wear to pitch control systems.

BRIEF SUMMARY

In an embodiment of the invention, a method is provided for controlling a wind turbine. The method includes receiving a power reference signal in a wind turbine controller that defines a requested power output level lower than an available power level and setting a blade pitch of a rotor of the wind turbine based on the received power reference signal that causes the rotor to capture wind power that is approximately equal to the requested power output level. The method further includes controlling the output power level of the wind turbine to the requested power output level by adjusting a load torque provided to the rotor by a generator coupled to the rotor.

In another embodiment of the invention, a controller for a wind turbine is provided that includes a processor and a memory. The memory includes instructions that, when executed by the processor, cause the processor to receive a power reference signal that defines a requested power output level lower than an available power level. The processor then sets the blade pitch of the rotor of the wind turbine based on the received power reference signal that causes the rotor to capture wind power that is approximately equal to the requested power output level, and controls the output power level of the wind turbine to the requested power output level by adjusting the load torque provided to the rotor by the generator coupled to the rotor.

In another embodiment of the invention, a method of de-rating a wind turbine is presented. The method includes operating a wind turbine at a de-rated power output level below the available power output of the wind turbine by adjusting the pitch of the turbine to reduce the power coefficient of the rotor below an optimal power coefficient so that the aerodynamic power output of the rotor is about equal to the de-rated power output level. The method further includes controlling a load provided to the rotor by a generator coupled to the rotor so that the power output of the wind turbine tracks fluctuations in the speed of the wind.

In another embodiment of the invention, a computer program product is presented that includes program instructions stored on a non-transitory computer readable storage medium. The program instructions, when executed by a processor, cause the processor to receive the power reference signal that defines a requested power output level lower than an available power level. The processor then sets the blade pitch of the rotor of the wind turbine based on the received power reference signal that causes the rotor to capture wind power that is approximately equal to the requested power output level, and controls the output power level of the wind turbine to the requested power output level by adjusting the load torque provided to the rotor by the generator coupled to the rotor.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Generally, the embodiments of the invention are directed to control methods and systems for wind energy applications that reduce the amount of pitching required to maintain desired power output levels.

Figure 2:
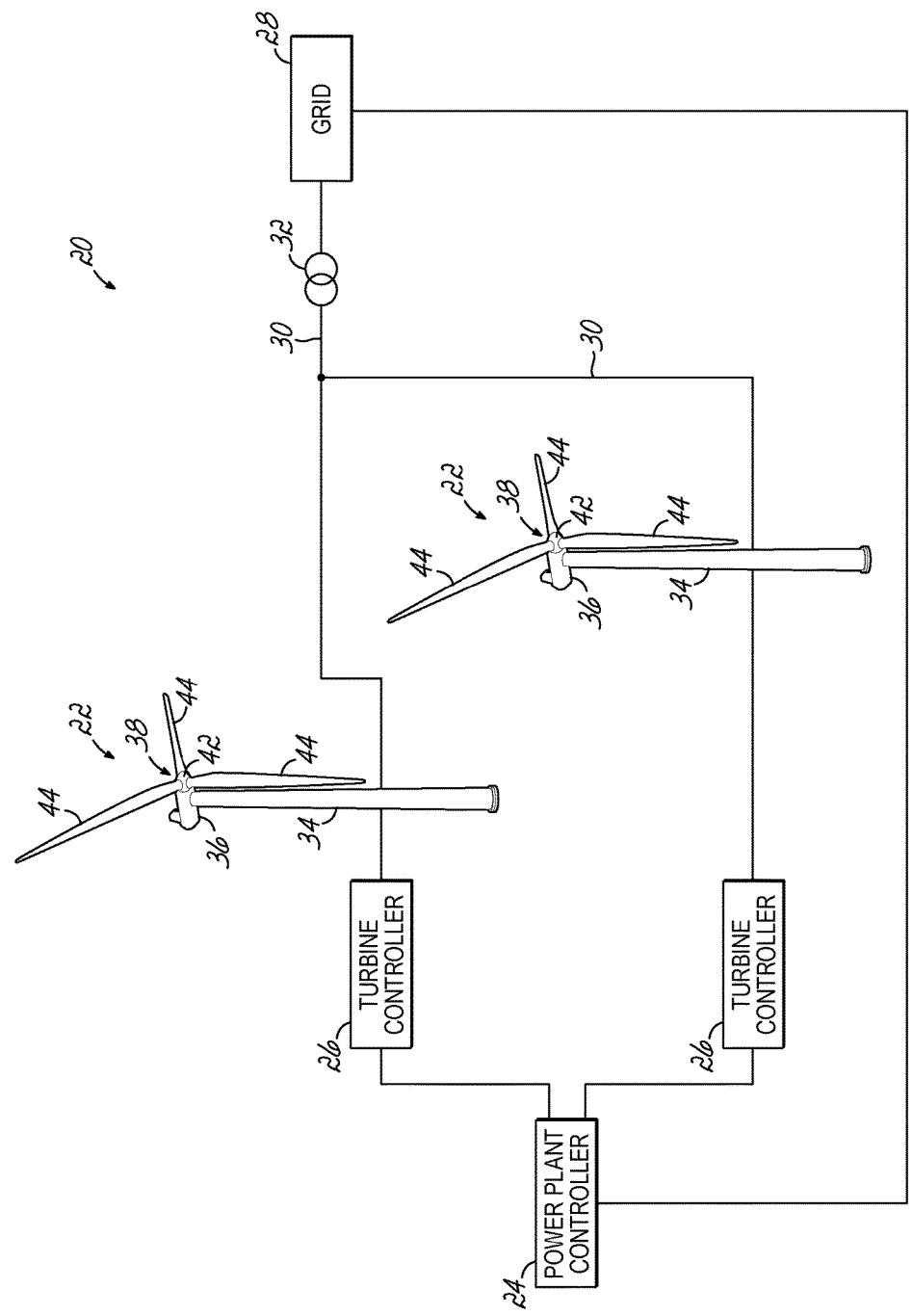
FIG. 2 is a diagrammatic view of a wind farm including a power plant controller and a plurality of wind turbines each controlled by wind turbine controller.

Referring now to FIG. 2, an exemplary wind farm 20 includes a plurality of wind turbines 22 and a power plant controller 24 in communication with a plurality of wind turbine controllers 26. The wind turbines 22 may be electrically coupled to the electrical grid 28 via an internal wind farm grid 30 that is electrically coupled to the electrical grid 28 at a common point of connection 32. Each wind turbine 22 may include a tower 34, a nacelle 36 disposed at the apex of the tower 34, and a rotor 38 operatively coupled to a generator 40 (FIG. 3) housed inside the nacelle 36. In addition to the generator 40, the nacelle 36 may house various components needed to convert wind energy into electrical energy and also various components needed to operate and optimize the performance of the wind turbine 22. The tower 34 supports the load presented by the nacelle 36, rotor 38, and other wind turbine components housed inside the nacelle 36. The tower 34 of the wind turbine 22 operates to elevate the nacelle 36 and rotor 38 to a height above ground level or sea level, as may be the case, at which air currents having lower turbulence and higher velocity are typically found.

The rotor 38 includes a central hub 42 and a plurality of blades 44 attached to the central hub 42 at locations distributed about the circumference of the hub 42. In the representative embodiment, the rotor 38 includes three blades 44. The blades 44, which project radially outward from the hub 42, are configured to interact with the passing air currents to produce lift that causes the hub 42 to spin about its longitudinal axis. The hub 42 may include a blade pitch mechanism (not shown) that adjusts the pitch of the blades 44 in response to a pitch control signal from the turbine controller. The blade pitch mechanism may adjust blade pitch by activating one or more slew drives or other suitable actuators to rotate the blades 44 to increase or decrease the blade's angle of attack based on the pitch control signal.

Figure 3:
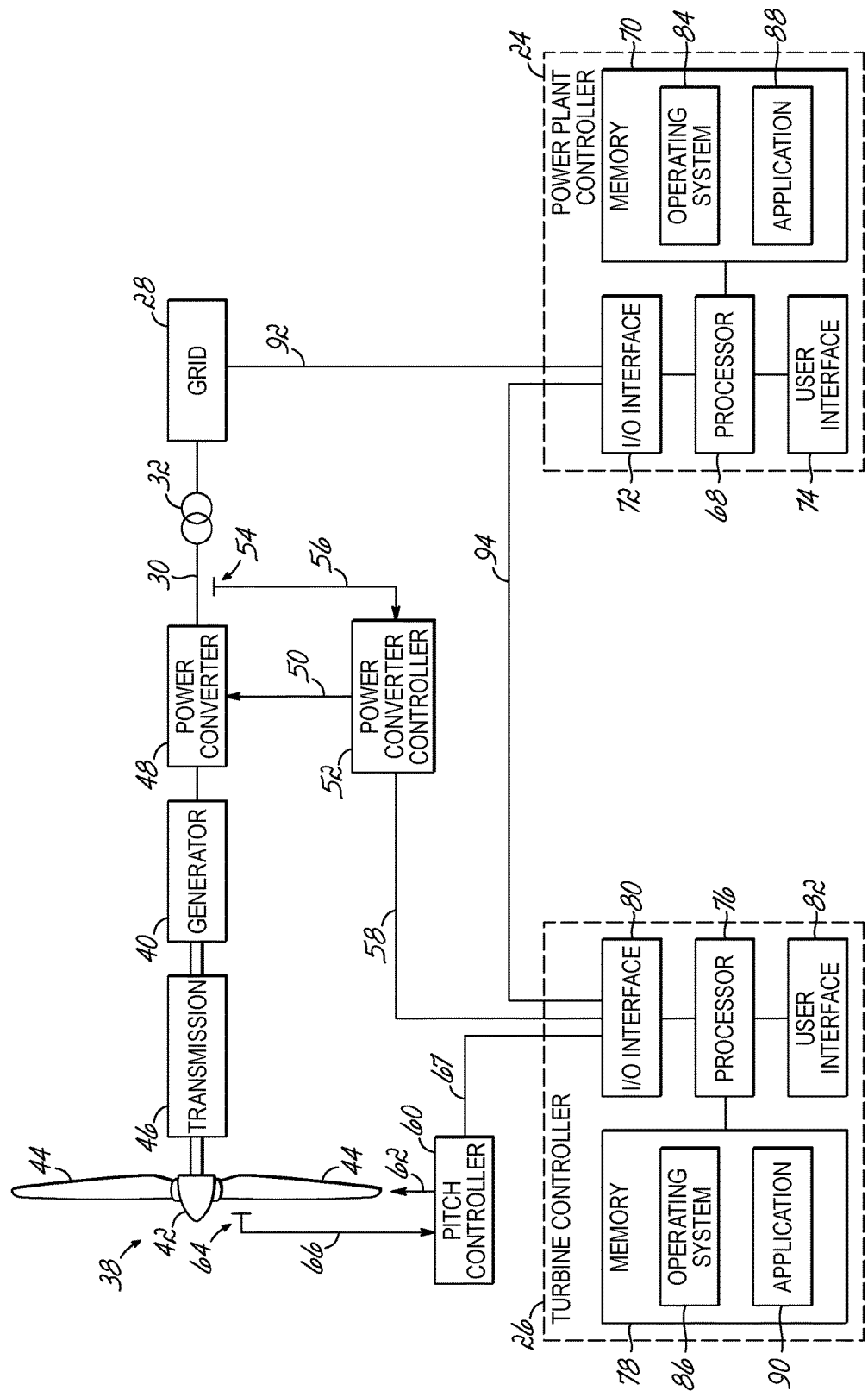
FIG. 3 is a diagrammatic view of the wind farm in FIG. 2 showing additional details of the power plant and wind turbine controllers.

Referring now to FIG. 3, the rotor 38 of wind turbine 22 may be coupled to the generator 40 via a transmission 46 that converts the slow rotation of rotor 38 into a rotation having a suitable angular velocity for generating electricity with generator 40. The generator 40 may be electrically coupled to the wind farm grid 30 by a power converter 48 that converts the electrical output of the generator 40 into electrical power having a voltage and frequency suitable for coupling to the electrical grid 28. To this end, the power converter 48 may include power conversion circuits such as one or more rectifiers and/or inverters that adjust the coupling between the wind farm grid 30 and the generator 40 in response to control signals 50 received from a power converter controller 52.

The power converter controller 52 may be coupled to voltage and/or current sensors 54 that provide feedback signals 56 which characterize the power being coupled between the wind farm grid 30 and the generator 40. These signals 56 may be indicative of voltages and/or currents at the output of the power converter 48 as well as voltages and/or currents within the power converter 48. For example, the feedback signals 56 may include signals indicative of a voltage and/or current associated with a DC bus connecting a generator side converter to a grid side converter within the power converter 48. In any case, the converter controller 52 generates the power converter control signal 50 based on the feedback signal 56 and a power reference signal 58 received from the turbine controller 26. The converter controller 50 thereby adjusts the electrical load provided to the generator 40 in response to the power reference signal 58 by controlling the phase, frequency, and/or amplitude of the voltages and currents supplied to the wind farm grid 30 by the power converter 48. This electrical load may cause the generator 40 to provide a load torque to the rotor 38 via the transmission 46. The load torque provided by the generator 40 may be proportional to the electrical load, and may act in opposition to an aerodynamic torque generated by the action of wind against the rotor 38. The power converter controller 52 may thereby control how much power is provided to the grid 28 by adjusting the load torque provided to the rotor 38 by the generator 40. The load torque may also be adjusted to control the speed of the rotor 38. For example, a load torque less than the aerodynamic torque generated by the rotor 38 may result in the rotor 38 accelerating to a higher rotational velocity. Similarly, a load torque greater than the aerodynamic torque may result in the rotor 38 decelerating to a lower rotational velocity.

To control the pitch of the blades 44, a pitch controller 60 may provide a pitch control signal 62 to the pitch control mechanism in hub 42. The pitch controller 60 may also be coupled to a pitch position sensor 64 in hub 42. The pitch controller 60 may determine the blade pitch angle based on a pitch position signal 66 received from the position sensor 64, and receive a pitch position command signal 67 from the turbine controller 26. To control the pitch of the blades 44, the pitch controller 60 may generate a pitch error signal based on a difference between the determined blade pitch angle and the desired pitch angle. This error signal may be used to generate the pitch control signal 62, which activates the pitch control mechanism to adjust the pitch of the blades to reduce the pitch error. To this end, the pitch controller 60 may include Proportional-Integral-Derivative (PID) control circuitry to provide a closed loop control system responsive to the pitch position signal. In an alternative embodiment of the invention, the pitch controller 52 may include an open loop controller that adjusts the blade pitch based on the pitch position signal and a lookup table or other suitable control means that does not rely on feedback signals from the position sensor 64.

The power plant controller 24 may include a processor 68, memory 70, an input/output (I/O) interface 72, and a user interface 74. The turbine controller 26 may similarly include a processor 76, memory 78, an input/output (I/O) interface 80, and a user interface 82. Each of the processors 68, 76 may include one or more processing circuits selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in the associated controller memory 70, 78. Each of the memories 70, 78 may comprise a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or any other device capable of storing digital information. Each of the memories 70, 78 may also include one or more mass storage devices (not shown) that may comprise a single mass storage device or a plurality of mass storage devices including, but not limited to, hard drives, optical drives, tape drives, non-volatile solid state devices and/or any other device capable of storing data.

Each I/O interface 72, 80 operatively couples its respective processor 68, 76 to other components of the wind farm 20. The I/O interfaces 72, 80 may include signal processing circuits that condition incoming and outgoing signals so that the signals are compatible with both the respective processor 72, 80 and the components to which the processor 72, 80 is coupled. To this end, each I/O interface 72, 80 may include analog to digital (A/D) and/or digital to analog (D/A) converters, voltage level and/or frequency shifting circuits, optical isolation and/or driver circuits, and/or any other analog or digital circuitry suitable for coupling the processor 72, 80 to the other components of the wind farm 20. Each I/O interface 72, 80 may also employ one or more suitable communication protocols for communicating with other system components, such as User Datagram Protocol/Internet Protocol (UDP/IP), and/or Transmission Control Protocol/Internet Protocol (TCP/IP). The I/O interfaces 72, 80 may be communicatively connected via a hardwired link, such as an IEEE 802.3 (Ethernet) link, a wireless link using a wireless network protocol, such as an 802.11 (Wi-Fi) link, or any other suitable link that allows the controller 24, 26 to interface other system components. The I/O interfaces 72, 80 may also be communicatively connected via a network (not shown), which may include a plurality of interconnected networks, such as one or more Local Access Networks (LANs), Wide Access Networks (WANs), and/or public networks, such as the Internet.

Each of the processors 68, 76 may operate under the control of a respective operating system 84, 86, which may reside in the corresponding memory 70, 78 of the respective controller 24, 26. The operating system 84, 86 may manage the computer resources of respective controller 24, 26 so that computer program code embodied as one or more computer software applications 88, 90 residing in memory 70, 78 may have instructions executed by the processor 68, 76. The user interface 74, 82 may be operatively coupled to the processor 68, 76 of the respective controller 24, 26 in a known manner. Each user interface 74, 82 may include output devices, such as alphanumeric displays, a touch screen, and other visual indicators, and input devices and controls, such as an alphanumeric keyboard, a pointing device, keypads, push-buttons, control knobs, etc., capable of accepting commands or input from an operator and transmitting the entered input to the processor 68, 76.

In operation, the power plant controller 24 may receive a power request signal 92 from the grid 28 indicating an amount and type (active or reactive) of power the grid operator desires the wind farm 20 to provide to the grid 28. In response to the power request signal ($P_{REQ}$) 92, the power plant controller may issue a power reference signal ($P_{REF}$) 94 to the wind turbine controller 26 that indicates the amount of power output desired from the turbine 22. Under normal operation, $P_{REF}$ will typically be greater than or equal to $P_R$, so that the turbine controller 26 operates in the power-optimal control mode, which outputs the available power output $P_A$ under the current wind conditions. That is, the power output of the turbine will be controlled to generally follow the available power curve 12. If the power request signal 92 indicates to the power plant controller 24 that the wind farm 20 is to be operated under de-rated operating conditions, the power reference signal 94 may indicate that the turbine controller 26 is to limit the power output of the wind turbine 22 to less than the wind turbine's rated power output $P_R$.

Figure 1:
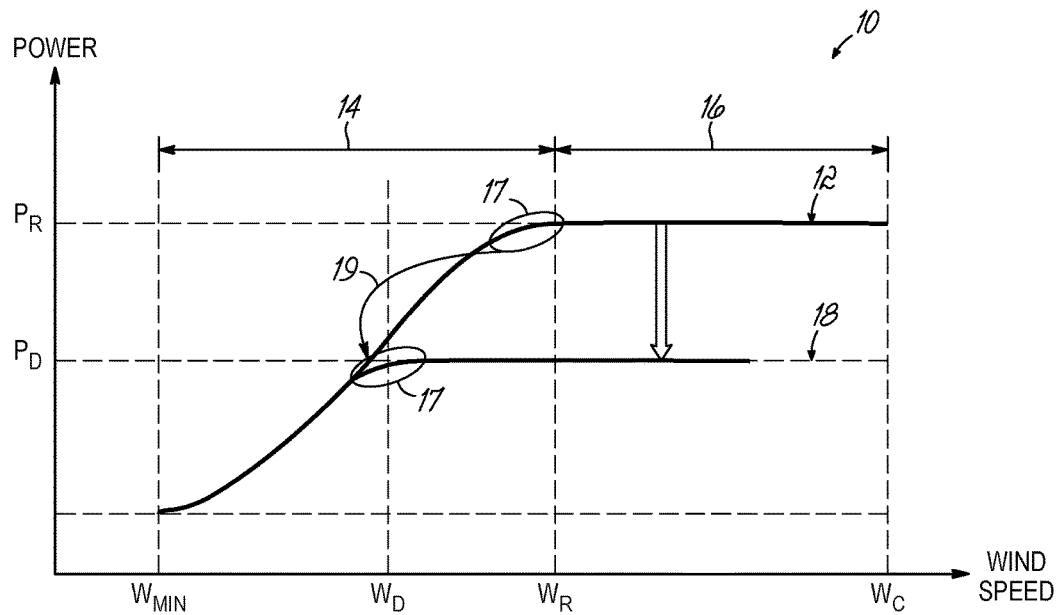
FIG. 1 is a graphical view showing an available power output curve with respect to wind speed for a wind turbine and a de-rated power output curve for a conventional wind turbine controller.
Figure 4:
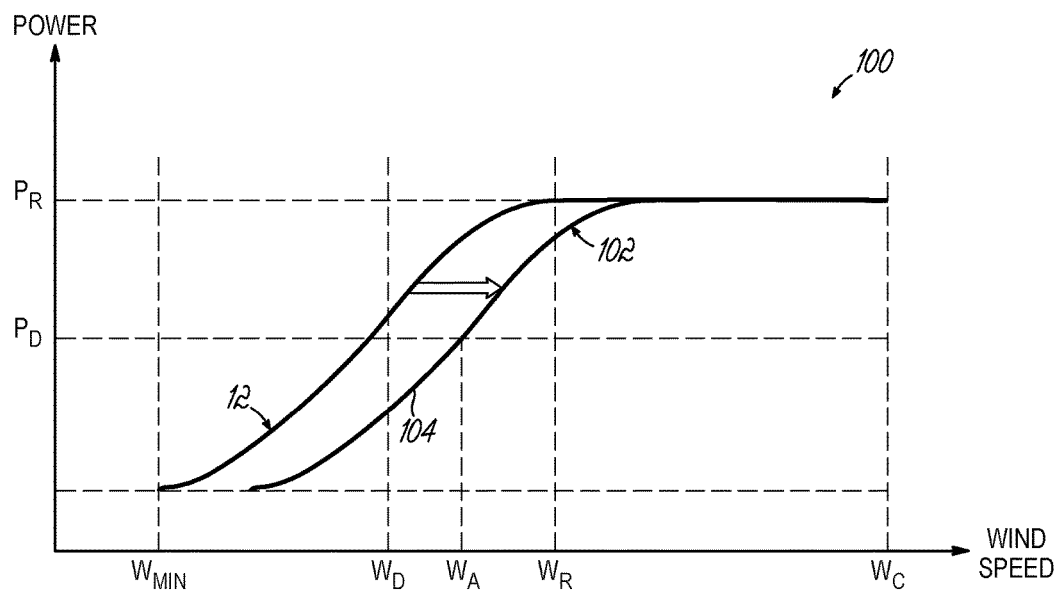
FIG. 4 is a graphical view showing the available power output curve with respect to wind speed for a wind turbine and a de-rated power output curve implemented in accordance with an embodiment of the invention.

Referring now to FIG. 4, a graphical diagram 100 illustrates the available power curve 12 and a partial-load de-rated power curve 102 for the wind turbine 22 in accordance with an embodiment of the invention. In response to the power grid operator requesting the wind farm 20 operate at a de-rated power level, the power plant controller 24 may generate a power reference signal 94 that indicates the wind turbine 22 is to operate at a de-rated power output level $P_D$. In response to receiving this signal 94, the wind turbine controller 26 generates the partial-load de-rated power curve 102 by shifting the available power output curve 12 to the right so that the wind turbine power output is about $P_D$ for the current or actual wind speed $W_A$. This is in contrast to a conventional turbine controller, which generates the de-rated power output curve 18 by shifting the available power output curve 12 down. Because the de-rated power output curve 102 is generated by shifting the available power curve 12 to the right, the wind turbine controller 26 operates in a partial-load control segment 104 of the de-rated power output curve 102 at wind speeds above the de-rated wind speed $W_D$ rather than in a full-load control region.

This shift to the right may be accomplished by offsetting the pitch angle from the optimal setting normally used when operating in the partial-load control region. The non-optimal blade pitch shifts the power output curve of the turbine 22 by reducing the power coefficient $C_P$ of the rotor 38. The wind turbine 22 thereby generates the requested de-rated power output at wind speeds above $W_D$ without entering into the full-load control region. The partial-load de-rated power curve 102 may thereby reduce the blade pitching activity of wind turbine 22 when operated under de-rated operating conditions at wind speeds above $W_D$ as compared to conventional wind turbines lacking the partial-load de-rating feature.

In a conventional turbine controller operating in the partial-load control region, the optimal pitch angle $\theta^*$ may be determined as a function of the actual wind speed $W_A$ using, for example, a lookup table. That is, the desired pitch angle may be determined by $\theta^*=F(w)$, where $\theta^*$ is the power-optimal pitch angle, w is the actual wind speed, and $F(\bullet)$ is a one dimensional look-up table generated based on the known aerodynamic properties of the blades 44 of rotor 38. A one dimensional lookup table may also determine the desired pitch angle based on a tip speed ratio $\lambda$ that represents the ratio between the speed of the tip of the rotor blade 44 and the wind speed. The blade tip speed ratio may be determined from the equation $\lambda=r\times\omega/w$, where r is the radius of the rotor 38, $\omega$ is the angular velocity of the rotor 38, and w is the actual wind speed. In this alternative turbine controller, the desired pitch angle may be determined by $\theta^*=F(\lambda)$.

Figure 5:
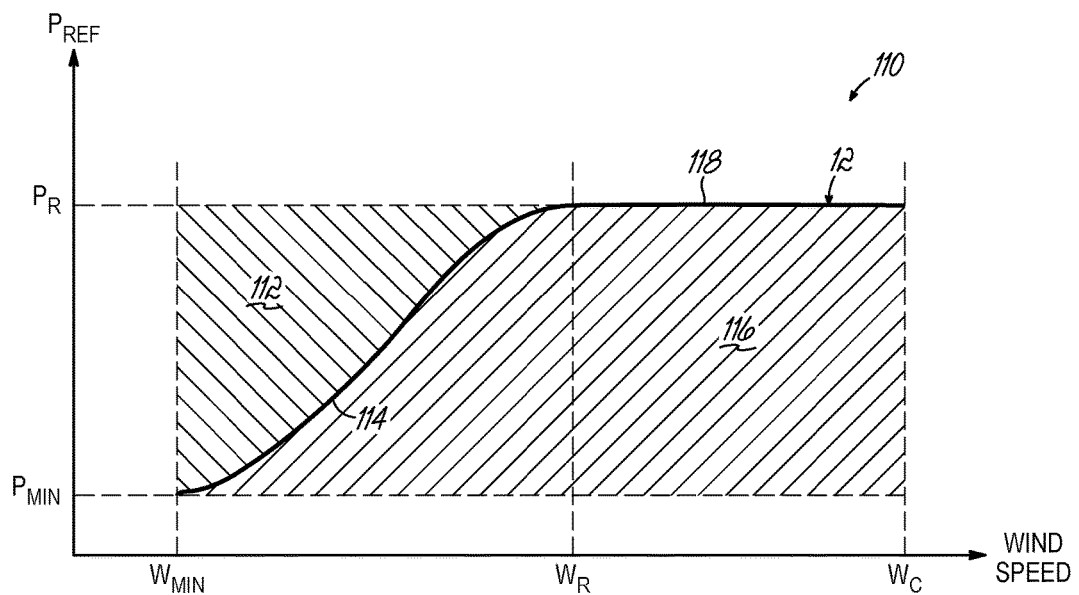
FIG. 5 is a graphical view of a requested power level verses wind speed showing a first region in which the partial-load control mode is implemented and a second region in which a full-load control mode is implemented.

Referring now to FIG. 5, a graphical diagram 110 includes a first region of operation 112 that includes a low-wind segment 114 of the available power output curve 12 that is to the left of the rated wind speed $W_R$. The first region of operation 112 also includes a region of the graphical diagram 110 to the left of the low-wind section 114, which is typically an area in which the wind turbine 22 cannot operate due to the upper bound on the power coefficient $C_P$ of the rotor 38. A second region of operation 116 includes a high-wind segment 118 of the available power output curve 12 that is to the right of the rated wind speed $W_R$. The second region of operation 116 also includes the region of the graphical diagram 110 to the right of low-wind segment 114. The conventional turbine controller operates in the partial-load control mode in response to a wind speed and $P_{REF}$ that maps to a location in the first region of operation 112 (e.g., points on the low-wind segment 114), and operates in the full-load control mode in response to a wind speed and $P_{REF}$ that maps to a location in the second region of operation 116. The output power of the wind turbine 22 thus follows the available power output curve 12 for a requested power level $P_{REF}$ equal to or above the available power output curve 12 for a given wind speed.

In an embodiment of the invention, partial-load de-rating control may enable the partial-load control mode to be implemented in the second region 116 by utilizing a two-dimensional lookup table that includes the requested power level $P_{REF}$ as a pitch selection parameter. Thus, the blade pitch setting in this exemplary embodiment of the partial-load de-rating controller may be represented by the equation $\theta^{Pref}=G(w, P_{REF})$, where $\theta^{Pref}$ represents a pitch angle that provides the requested power output $P_{REF}$ at the actual wind speed w. The blade pitch $\theta^{Pref}$ therefore depends on both the actual wind speed w and the power reference signal $P_{REF}$. Similarly as with the one dimensional lookup table $F(\bullet)$, the two-dimensional lookup table $G(\bullet,\bullet)$ may be generated based on the known aerodynamic properties of the blades 44 of rotor 38. In an alternative embodiment of the invention, the two dimensional lookup table may utilize the tip speed ratio $\lambda$ instead of the wind speed w similarly as discussed above with respect to the one-dimensional lookup table. In this alternative embodiment, the blade pitch setting may be represented by the equation $\theta^{Pref}=G(\lambda, P_{REF})$.

The wind turbine controller 26 may also include conventional partial-load and full-load control algorithms. For example, by setting $P_{REF}$ equal to the available power $P_A$, the pitch angle provided by the two-dimensional look-up table for a given wind speed may equal the pitch angle provided by the one-dimensional power-optimal solution. That is, $\theta^*=G(w, P\geq P_A)=F(w)$ or $\theta^*=G(\lambda, P\geq P_A)=F(\lambda)$. Adding the requested power level $P_{REF}$ to the turbine controller lookup table allows partial-load control mode to be selectively implemented in the second region 116.

In response to a wind speed and $P_{REF}$ that maps to a location in a region 112 of graphical diagram 110 to the left of the available power output curve 12, the turbine controller 16 selects a pitch angle $\theta^*$ that optimizes $C_P$ for the rotor 38. That is, if the requested power level $P_{REF}$ is set above the available output power and/or below the rated wind speed $W_R$, the power-optimized pitch angles are used to insure optimal energy capture. In response to a wind speed and $P_{REF}$ that maps to a location on graph 110 in a region 116 to the right of the available power output curve 12, the turbine controller 16 may select a pitch angle $\theta^{Pref}$ that reduces $C_P$ for the rotor 38 so that the power output of the rotor 38 is about equal to the requested power level $P_{REF}$. The two-dimensional look-up table thus permits the wind turbine 22 to be operated in either a partial-load or full-load control mode in region 116. If optimal energy capture is desired, the requested power level $P_{REF}$ can be set equal to or greater than the rated power level $P_R$. At this $P_{REF}$ setting, the turbine controller 26 will operate as a conventional controller by following the available power output curve 12. If a $P_{REF}$ setting for a desired turbine power output level that is below the available power output is issued by the power plant controller 24, the turbine controller 26 can be made to operate in the partial-load control mode. The partial-load control mode of operation may thereby be extended arbitrarily into the second region 116. Embodiments of the invention thereby enable the turbine controller 26 to implement partial-load control mode for any combination of requested power level $P_{REF}$ and wind speed $W_A$ within the bounds of allowable wind turbine operation and below the rated power output $P_R$.

Figure 6:
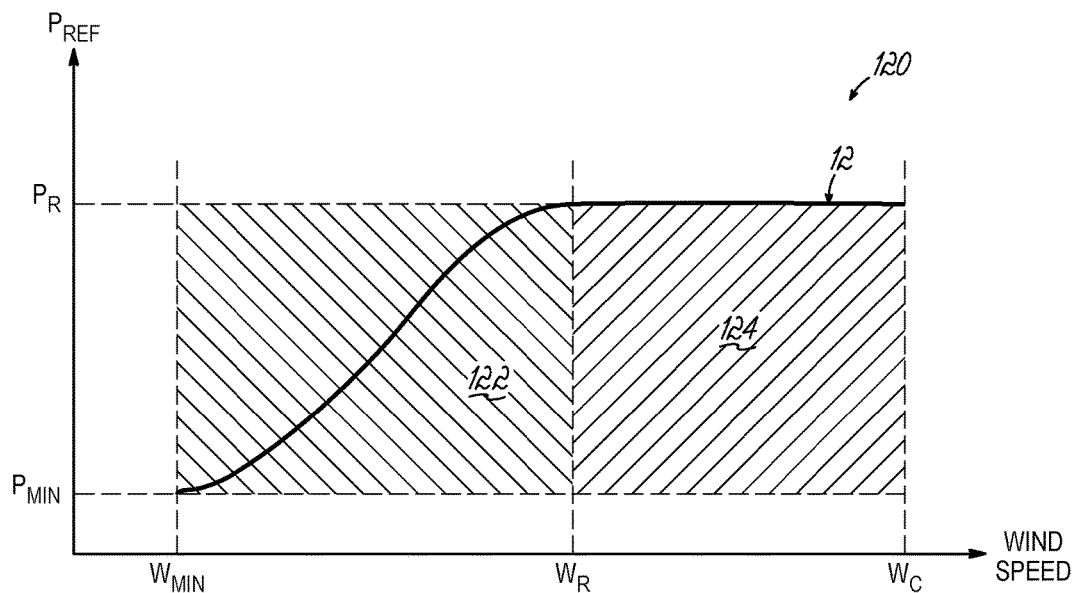
FIG. 6 is a graphical view of the requested power level verses wind speed graph in FIG. 5 with the first region expanded to include a region of the graph defined by a wind speed less than the rated wind speed.

Referring now to FIG. 6, a graphical diagram 120 that illustrates an embodiment of the turbine controller 26 in which a partial-load control region 122 includes the entire region that is below the rated power output $P_R$ of the wind turbine and to the left of the rated wind speed $W_R$. A full-load control region 124 is defined for power levels between the rated power output $P_R$ and the minimum power output $P_{MIN}$ for wind speeds between the rated wind speed $W_R$ and the cut-out wind speed $W_C$. That is, the full-load operation region 124 includes the remaining allowable operating conditions of the wind turbine 22 that lie outside the partial-load operation region 122. The partial-load operation mode for this exemplary embodiment is thus implemented by the turbine controller 26 for any operation of the wind turbine 22 in wind conditions below the rated wind speed $W_R$. As is readily apparent from an examination of FIG. 6, the full-load control region 124 has significantly less area than the second region 116. By reducing the area in which the turbine controller 26 operates in full-load control mode, the operational control mode mapping represented by graphical plot 120 may reduce the pitching activity as compared to conventional turbine controllers.

Figure 7:
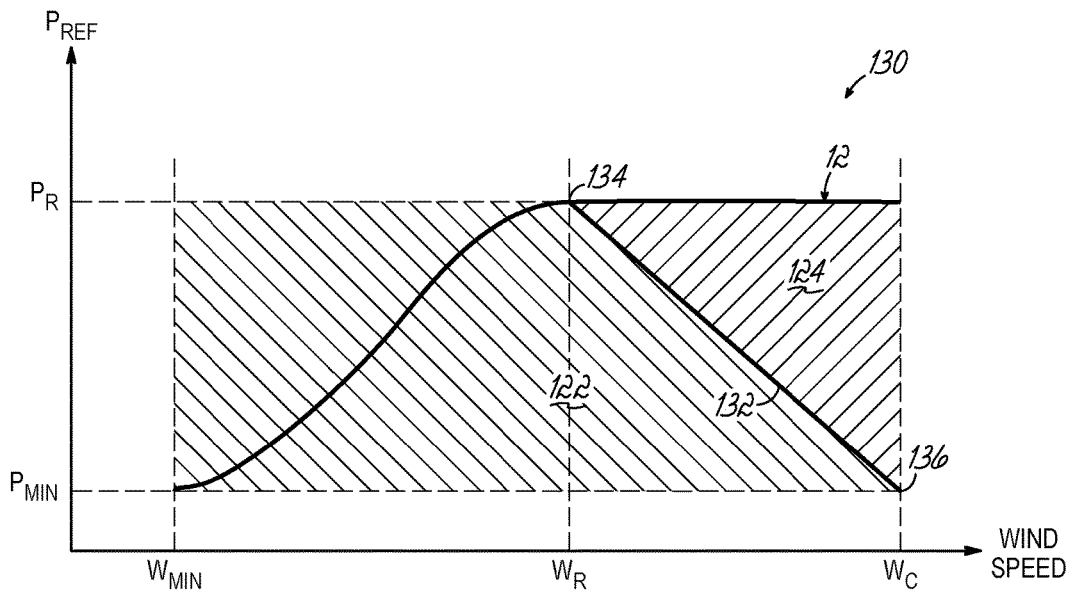
FIG. 7 is a graphical view of the requested power level verses wind speed graph in FIG. 5 with the first region expanded to include a region of the graph that includes wind speeds greater than the rated wind speed.

Referring now to FIG. 7, a graphical diagram 130 illustrates another embodiment of the turbine controller 26 in which the partial-load operation region 122 has been expanded further into a region below a mode boundary 132 defined by a line segment extending generally from a first point 134 located at coordinates ($W_R$, $P_R$) to a second point 136 located at coordinates ($W_C$, $P_{MIN}$). The partial-load operation mode is thereby extended into a region that includes wind conditions above the rated wind speed $W_R$. The control map illustrated by diagram 130 may be implemented to further reduce pitching activity of wind turbines 22 that are operating in a de-rated mode during high wind conditions. Full-load control mode may be implemented to keep wind turbine power production under tight control when generating electricity at rated power so as to avoid damaging the turbine. This is because any small increase above the rated power can harm the mechanical and electrical components of the wind turbine 22. However, if $P_{REF}$ is set below $P_R$ so that the power output of the wind turbine 22 is reduced to below the rated power output $P_R$, the wind turbine 22 will not be damaged by temporally exceeding the requested power level $P_{REF}$. The power production control mode graph 130 exploits this behavior by expanding operation in partial-load control mode to cover turbine operation at wind speeds above $W_R$.

If the requested power $P_{REF}$ is close to the rated power $P_R$, high turbulence levels in the wind could result in wind turbine power output levels temporarily exceeding the rated power of the turbine 22. To provide a margin of safety, the mode boundary 132 should be defined so that there is a region of full-load control between the mode boundary 132 and the rated power output level sufficient to prevent power output levels from exceeding $P_R$. Persons having ordinary skill in the art will thus recognize that the mode boundary 132 could be defined in many ways. Thus, although the mode boundary 132 is illustrated as a straight line in this exemplary embodiment, the mode boundary 132 could also have other shapes and could be altered based on wind conditions specific to the wind turbine being controlled. The mode boundary 132 could also be optimized based on empirical data collected at the wind turbine under actual operating conditions. Based on this data, the wind turbine controller 26 could alter the trade-off between the ability to stand large wind fluctuations (i.e., implementing a mode boundary 132 that produces a larger full-load control region 124) and minimizing pitch activity (i.e., implementing a mode boundary 132 that produces a larger partial-load control region 122).

When operating in the partial-load control mode, the turbine controller 26 may rely on pre-determined blade pitch settings that produce the requested power level $P_R$ for the current wind speed. To compensate for short-term wind fluctuations or gusts, the turbine controller 26 adjusts the power reference signal 58 provided to the power converter controller 52. As a consequence, the output power of the wind turbine 22 will also tend to fluctuate while the wind turbine controller 26 is operating in partial-load control mode. However, these power fluctuations may be similar to the behavior of conventional wind turbine controllers operating under "maximum production" or power-optimal control mode. Moreover, because the short-term fluctuations in the power output of individual wind turbines 22 may tend to be un-correlated with other turbines 22 operating in the wind farm 20, these fluctuations may average out in wind farms having large numbers of turbines 22.

Changes in the power production of the wind farm 20 that are not requested by the electrical grid 28 are generally unwelcome by the grid operator. Such changes may occur, for example, due to changes in the average wind speed. The grid operator may also request changes in the power output of the wind farm 20, such as in response to a grid fault or a change in the demand for electricity from the grid. When the grid operator requests a change in the power output of the wind farm 20, grid codes may require that the change be implemented quickly. Managing requested and unrequested changes in power output thus presents challenges to the power plant controller 24, which is required to manage some changes as quickly as possible, while suppressing other changes in order to meet grid code requirements. In general, it is desirable for power output changes requested by the grid to be enforced with fast transients, while unrequested power output changes are controlled so that the change occurs at a manageable rate. A typical grid code requirement may require that the wind farm power output be able to respond to a change in the power request signal 92 at a rate greater than or equal to X megawatts/second, where X represents the required response rate. Similarly, the grid code may require that the wind farm 20 not increase output power production unrequested (such as a response to increased wind speed) at a rate that is equal to or greater than Y megawatts/second. Grid codes typically set the unrequested response rate Y to a significantly lower value than the requested response rate X.

The fast reaction to the power request signal 92 may be handled by an internal ramp limiter in either the power plant controller 24 or in the wind turbine controller 26. The slower unrequested response rate limit is typically more challenging for the wind farm 20. Conventional wind farms 20 typically rely on the power plant controller 24 to control unrequested response rates. However, relying solely on the power plant controller 24 can cause increased wind turbine loading and reduced power production in steady state conditions. Another issue to consider is that decreasing power cannot be ramp rate limited to the extent that increasing power can. That is, if the wind speed drops, the wind turbines 22 will ultimately have to reduce their output power because there will be insufficient wind energy to maintain the previous power production level for a significant length of time.

Figure 8:
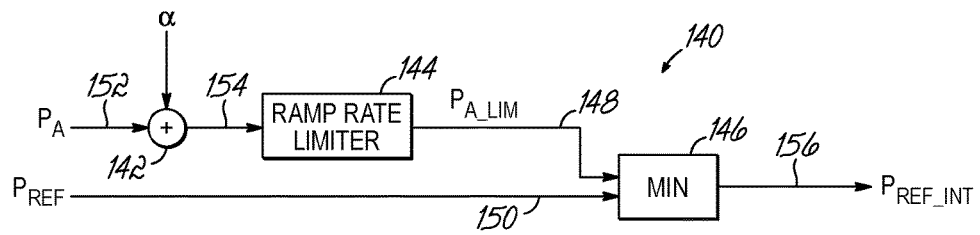
FIG. 8 is a diagrammatic view of a power level control circuit.

Referring now to FIG. 8, a power reference signal control circuit 140 includes a summer 142, a ramp rate limiter 144, and a signal selector 146 configured to selectively output an input signal 148, 150 having the lowest or minimum level as an internal power reference signal $P_{REF\_INT}$. $P_{REF\_INT}$ is then used by the turbine controller 26 in place of $P_{REF}$ to adjust the blade pitch and output power as described above. The requested power level control circuit 140 may be may be implemented as part of the expanded partial-load control mode to improve the response of the wind farm 20 to unrequested changes in power output. An available power signal 152 representing the available power output $P_A$ of the wind turbine 22 being controlled and tuning parameter α are summed to produce an adjusted available power signal 154. The tuning parameter α may provide an offset to the adjustable available power signal 154 so that during periods of steady power production, slightly more production is requested from the turbine 22 than what is available. The tuning parameter α may thereby avoid production losses during periods of steady production by keeping $P_{REF\_INT}$ above $P_A$.

The ramp rate limiter 144 may be configured to provide different ramp rates for decreases in power as compared to increases in power. For example, the ramp rate limiter 144 may be configured to impose a relatively low ramp rate limitation (or no limitation) for a dropping available power output $P_A$, and a relatively high ramp rate limitation for an increasing available power $P_A$ to facilitate compliance with grid codes. The signal selector 146 compares the ramp rate limited adjusted available power signal ($P_{A\_LIM}$) to $P_{REF}$, and outputs the lower of the two signals as $P_{REF\_INT}$.

Figure 9:
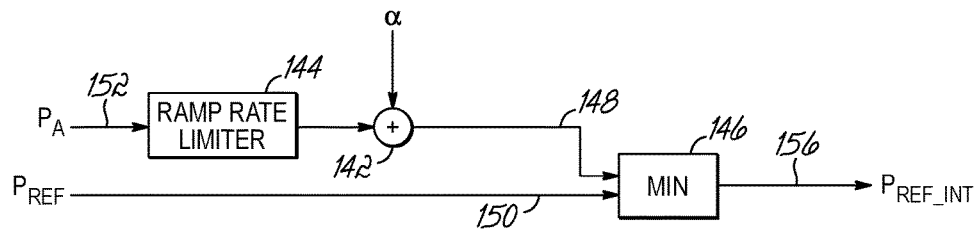
FIG. 9 is a diagrammatic view of an alternative embodiment of the power level control circuit in FIG. 8.

FIG. 9 illustrates an alternative embodiment of the requested power level control circuit 140 that operates in similar manner as the circuit illustrated in to FIG. 8, except that the tuning parameter α is added to the available power signal 152 after the signal 152 has been processed by the ramp rate limiter 144. Because the ramp rate limiter 144 responds to the rate of change of the signal rather than the signal level, and because the tuning parameter α will typically not change during normal operation of the turbine controller 26, the embodiment illustrated in FIG. 9 may operate to generate essentially the same resulting $P_{REF\_INT}$ as the embodiment illustrated in FIG. 8.

In steady state operation, the available power $P_A$ will not be changing rapidly, so the ramp rate limiter 144 will not limit the adjusted available power signal 154. $P_{REF\_INT}$ will therefore be equal to the lower of the requested power $P_{REF}$ or the adjusted available power signal $P_{A\_LIM}$. Typically, the requested power $P_{REF}$ will be set to a value that is greater than or equal to the available power to maximize power production. Under this operating condition, $P_{REF\_INT}$ will typically be equal to $P_{A\_LIM}$, and the turbine 22 will generate power equal to the available power output $P_A$. In response to an increase in requested power $P_{REF}$, the signal selector will continue to output $P_{A\_LIM}$, and the output of the turbine 22 will remain unaffected. However, in response to a drop in the requested power level $P_{REF}$ that drops below $P_{A\_LIM}$, the power level control circuit 140 may begin outputting $P_{REF\_INT}$ equal to $P_{REF}$. This may result in the turbine controller 26 lowering the output power of the turbine 22 at a rate that tracks $P_{REF}$ so long as the rate of change in $P_{REF}$ is within the response speed of the turbine 22. Thus, for requested power levels $P_{REF}$ below $P_{A\_LIM}$, the turbine controller 26 may adjust the output of the wind turbine 22 as quickly as possible to meet grid demands.

Under increasing wind speed conditions, the rate of change in the available power output $P_A$ may cause the adjusted available power signal 154 to exceed the ramp rate limit of the ramp rate limiter 144. In response, the ramp rate limiter 144 may cause the increase in $P_{A\_LIM}$ to lag the increase in the available power output $P_A$. The power level control circuit 140 may thereby limit the rate at which the turbine power output increases during periods of increasing wind to levels that comply with the grid code. If $P_{A\_LIM}$ exceeds the requested power $P_{REF}$, the power level control circuit 140 may cap $P_{REF\_INT}$ at $P_{REF}$ as discussed above, so that the output of the wind turbine 22 does not exceed the requested power level.

In contrast, under decreasing wind speed conditions, the rate of change in the available power output $P_A$ may not be sufficient to cause the adjusted available power signal 154 to exceed the ramp rate limit of the ramp rate limiter 144. In this case, $P_{A\_LIM}$ may track the available power output $P_A$. The power level control circuit 140 may thereby allow the rate at which the turbine power output decreases during periods of decreasing wind to track the available power $P_A$ while the adjusted available power signal 154 is less than $P_{REF}$. As is the case under steady and increasing wind conditions, if $P_{A\_LIM}$ exceeds the requested power $P_{REF}$, the power level control circuit 140 maintains $P_{REF\_INT}$ at $P_{REF}$, in which case the changes in $P_A$ will not be reflected in $P_{REF\_INT}$.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of", or variants thereof are used in either the detailed description or the claims, such terms are intended to be inclusive in a manner similar to the term "comprising."

As used herein, the term "in response to" means "in reaction to" and/or "after" a first event. Thus, a second event occurring "in response to" a first event may occur immediately after the first event, or may include a time lag that occur between the first event and the second event. In addition, the second event may be caused by the first event, or may merely occur after the first event without any causal connection.

As will be appreciated by one skilled in the art, the embodiments of the invention may also be embodied in a computer program product embodied in at least one computer readable storage medium having computer readable program code embodied thereon. The computer readable storage medium may be an electronic, magnetic, optical, electromagnetic, infrared, or semiconductor system, apparatus, or device, or any suitable combination thereof, that can contain, or store a program for use by or in connection with an instruction execution system, apparatus, or device. Exemplary computer readable storage media include, but are not limited to, a hard disk, a floppy disk, a random access memory, a read-only memory, an erasable programmable read-only memory, a flash memory, a portable compact disc read-only memory, an optical storage device, a magnetic storage device, or any suitable combination thereof. Computer program code for carrying out operations for the embodiments of the present invention may be written in one or more object oriented and procedural programming languages.

The methods described herein can be implemented by computer program instructions supplied to the processor of any type of computer to produce a machine with a processor that executes the instructions to implement the functions/acts specified herein. These computer program instructions may also be stored in a computer readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

The various embodiments of program code and/or system functions described herein may be identified based upon the application, function, or software component as it is implemented in a specific embodiment of the invention. However, it should be appreciated that any particular program nomenclature that follows is used merely for convenience, and thus the invention should not be limited to use solely in any specific application identified and/or implied by such nomenclature. It should be further appreciated that the various features, applications, and devices disclosed herein may be used alone or in combination. Moreover, given the typically endless number of manners in which computer programs may be organized into routines, procedures, methods, modules, objects, and the like, as well as the various manners in which program functionality may be allocated among various software layers that are resident within a typical computing system (e.g., operating systems, libraries, APIs, applications, applets, etc.), and/or across one or more hardware platforms, it should be appreciated that the invention is not limited to the specific organization and allocation of program functionality described herein.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, embodiments of the invention may be implemented with functions provided in power plant controller 24, the turbine controller 26, or combinations of the controllers 24, 26. Therefore, the invention in its broader aspects should not be limited to the specific details, representative methods, and illustrative examples shown and described.

Accordingly, departures may be made from such details without departing from the spirit or scope of the general inventive concept.

What is claimed is:

1. A method of controlling a wind turbine, the method comprising:
   generating a power reference signal, which comprises:
      receiving an available power output signal,
      processing the available power output signal through a ramp rate limiter to produce a ramp rate limited available power output signal,
      comparing the ramp rate limited available power output signal to a requested power level signal, and
      selecting the lower of the ramp rate limited available power output signal and the requested power level signal as the power reference signal;
   receiving the power reference signal in a wind turbine controller that defines a requested power output level lower than an available power level;
   setting a blade pitch of a rotor of the wind turbine based on the received power reference signal that causes the rotor to capture wind power that is approximately equal to the requested power output level; and
   controlling the output power level of the wind turbine to the requested power output level by adjusting a load torque provided to the rotor by a generator coupled to the rotor.

2. The method of claim 1 wherein the blade pitch setting causes the rotor to capture less wind power than an optimal blade pitch setting.

3. The method of claim 1 wherein setting the blade pitch comprises:
   determining an actual wind speed;
   selecting a first coordinate of a two-dimensional lookup table based on the actual wind speed;
   selecting a second coordinate of the two-dimensional lookup table based on the requested power output level;
   identifying an entry of the two-dimensional lookup table based on the selected coordinates; and
   setting the blade pitch based on the value of the identified two-dimensional lookup table entry.

4. The method of claim 1 wherein the available power level is less than a rated power of the wind turbine.

5. The method of claim 1 wherein an available wind power is greater than a rated power of the wind turbine.

6. The method of claim 1 wherein the ramp rate limiter is configured to limit the rate of change of the ramp rate limited available power output signal to a first rate for an increasing available power output signal, and limit the rate of change of the ramp rate limited available power output signal to a second rate for a decreasing available power output signal.

7. The method of claim 1 wherein generating the power reference signal further comprises:
   adding a tuning factor to one of the available power output signal or the ramp rate limited available power output signal.

8. A controller for a wind turbine comprising:
   a processor; and
   a memory including instructions that, when executed by the processor, cause the processor to:
      receive a power reference signal that defines a requested power output level lower than an available power level, wherein generating the power reference signal comprises:
      receiving an available power output signal,
      processing the available power output signal through a ramp rate limiter to produce a ramp rate limited available power output signal,
      comparing the ramp rate limited available power output signal to a requested power level signal, and
         selecting the lower of the ramp rate limited available power output signal and the requested power level signal as the power reference signal;
      set a blade pitch of a rotor of the wind turbine based on the received power reference signal that causes the rotor to capture wind power that is approximately equal to the requested power output level; and
      control the output power level of the wind turbine to the requested power output level by adjusting a load torque provided to the rotor by a generator coupled to the rotor.

9. The controller of claim 8 wherein the processor is part of a power plant controller.

10. The controller of claim 8 wherein the processor is part of a wind turbine controller.

11. A computer program product comprising:
    a non-transitory computer readable storage medium; and
    program instructions stored on the computer readable storage medium, wherein the program instructions, when executed by a processor, cause the processor to:
       receive a power reference signal that defines a requested power output level lower than an available power level, wherein generating the power reference signal comprises:
       receiving an available power output signal,
       processing the available power output signal through a ramp rate limiter to produce a ramp rate limited available power output signal,
       comparing the ramp rate limited available power output signal to a requested power level signal, and
          selecting the lower of the ramp rate limited available power output signal and the requested power level signal as the power reference signal;
       set a blade pitch of a rotor of the wind turbine based on the received power reference signal that causes the rotor to capture wind power that is about equal to the requested power output level; and control the output power level of the wind turbine to the requested power output level by adjusting a load torque provided to the rotor by a generator coupled to the rotor.

* * * * *